Oct. 17, 1967  R. S. LOMBARD  3,346,924
INJECTION MOLD LOCKING DEVICE
Filed Jan. 28, 1965  3 Sheets-Sheet 1

INVENTOR
Ralph S. Lombard
BY
Rockwell and DeLio
ATTORNEYS

Oct. 17, 1967  R. S. LOMBARD  3,346,924
INJECTION MOLD LOCKING DEVICE
Filed Jan. 28, 1965  3 Sheets-Sheet 2
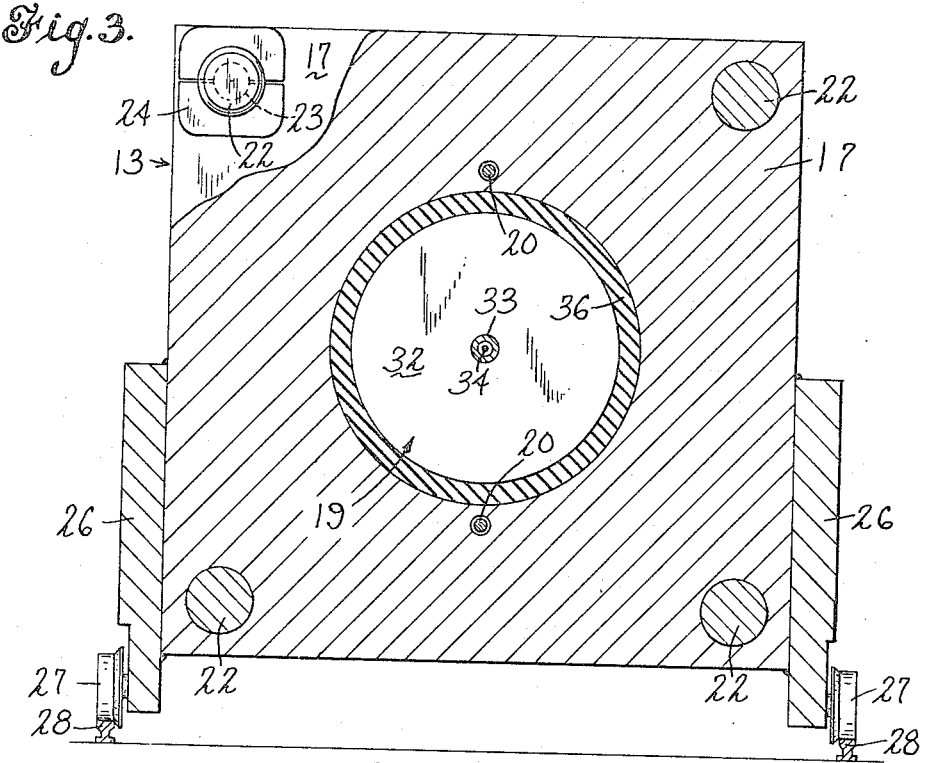
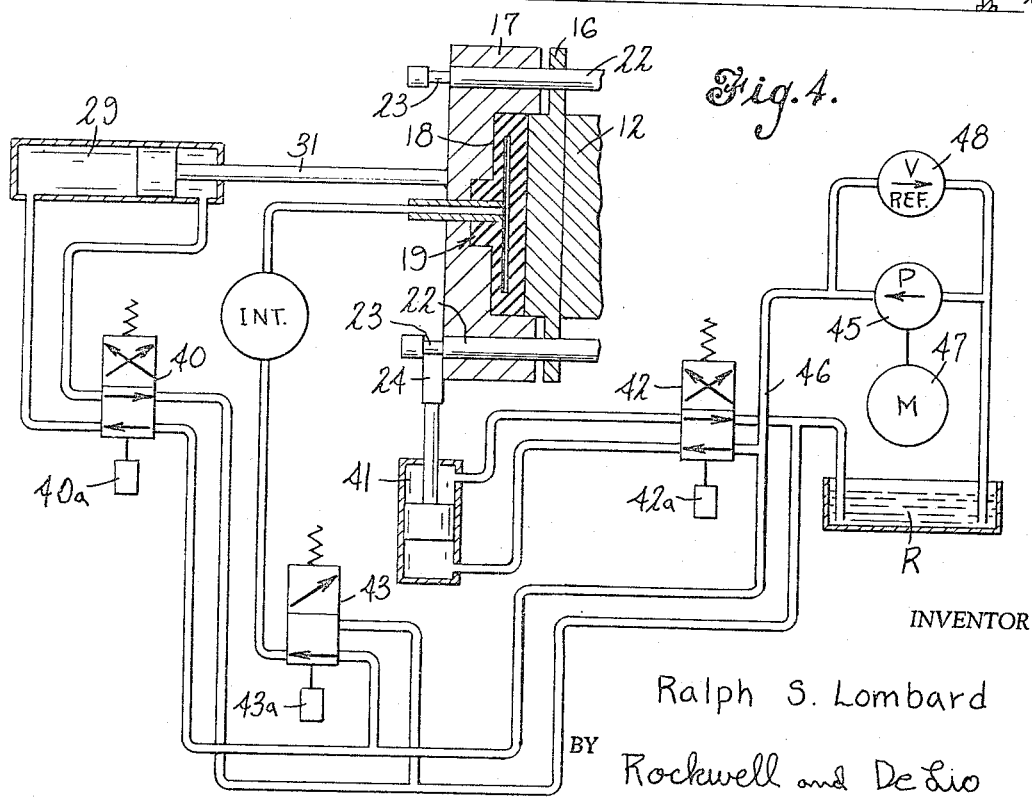
INVENTOR
Ralph S. Lombard
BY Rockwell and DeLio
ATTORNEYS

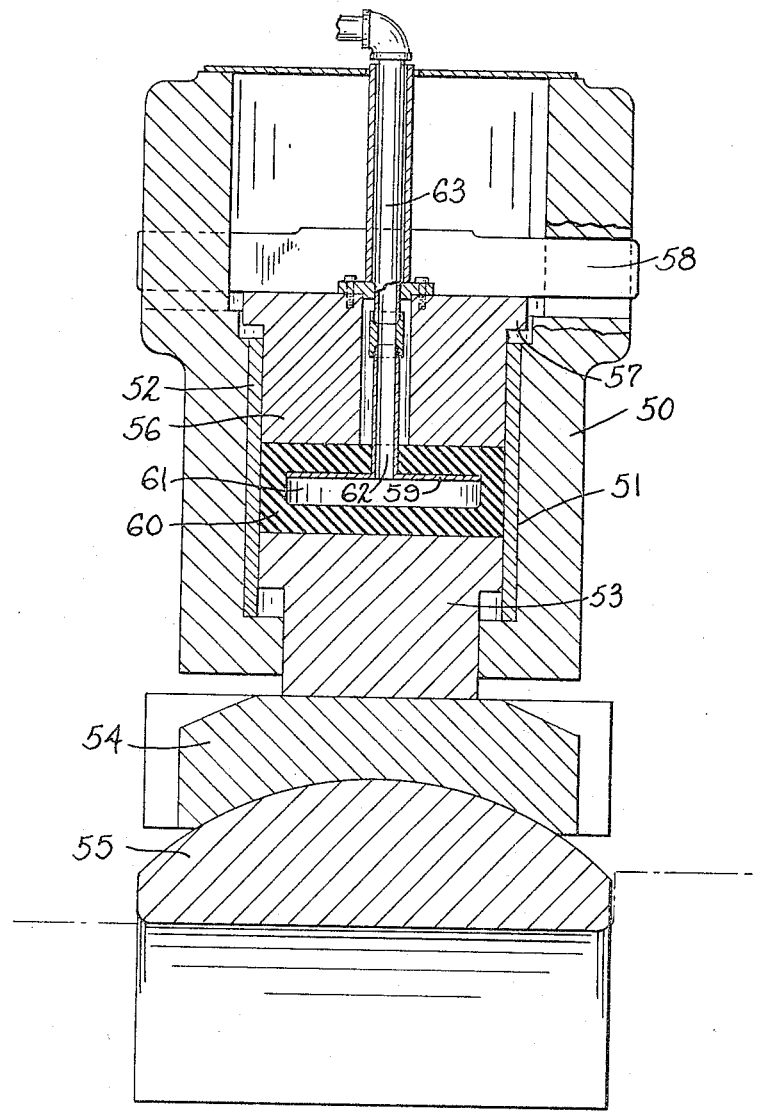

United States Patent Office 3,346,924
Patented Oct. 17, 1967

3,346,924
INJECTION MOLD LOCKING DEVICE
Ralph S. Lombard, 176 Pinewood Road,
Stamford, Conn. 06903
Filed Jan. 28, 1965, Ser. No. 429,959
9 Claims. (Cl. 18—30)

This invention relates to force producing apparatus and more particularly relates to new and improved means for exerting a high force acting over a short distance.

This application is a continuation-in-part of co-pending application Ser. No. 343,694, filed Feb. 10, 1964, now abandoned.

This invention provides means for exerting a large force over a short distance to move an object and to further provide a holding or locating function of such member in a given or predetermined position. Apparatus embodying the invention in certain instances may be conveniently and economically used instead of hydraulically or pneumatically operated pistons.

In many applications where it is desired to move a member and hold such member under load in a given position, hydraulic or in some cases pneumatically operated cylinders, together with the pistons therein are utilized. Such cylinders include a piston which must have a stroke equal to the maximum distance that the member must be moved. In many installations the use of a hydraulic cylinder for holding functions has inherent disadvantages in that the cost of the hydraulic cylinder may be quite high. In the case of a hydraulic cylinder used as a clamp the piston in the cylinder must be accelerated and decelerated, along with the member moved and clamped thereby, twice during an operative cycle, thus requiring a great deal of power and possibly causing shocks as it starts and stops. Also, the hydraulic system required for control of the cylinder, together with its pipes and valves required to displace the hydraulic fluid into and out of the clamping cylinder may be quite expensive. Additionally, there is the ever present problem of seals and maintenance to prevent fluid leakage.

One embodiment of the invention is its use as a clamp for holding together the platents of an injection molding machine. Injection molding machines generally comprise an injector unit which plasticizes various types of material in a plastic form and then injects the material under high pressure into a mold cavity. The mold itself is mounted between two platents. One platen, being stationary, carries one portion of the mold and the other platen, being movable, carries the other portion of the mold. The motion of the moving platen permits opening of the cavity defined by the mold sections for removal of a molded part therefrom, and permits the use of dies or molds of varying shapes and sizes between the two platens. Because of the large pressures involved in injection molding, means must be provided to hold the mold sections in close engagement during injection of the plastic material into the mold to prevent flashing between the mold sections. Flashing of the mold material often results in inaccuracies in the finished part.

To hold the mold sections or halves in engagement against the large molding pressure which tends to separate the mold sections, large tie rods are usually provided between the stationary and movable platents to hold the platens in predetermined relationship. However, it has been found that the use of such tie rods to react the forces tending to separate the mold sections does not always produce satisfactory results and the molding material is likely to flash between the mold halves. To overcome the problem of flashing of molding material when only reaction elements are utilized to hold the mold parts together it has been conventional practice to use a large hydraulic ram to close the movable platen and also preload the mold to withstand the large molding pressures. This preload is found to be necessary to prevent separation of the die halves when high pressure plastic or metal is injected into the mold cavity.

Conventional injection molding machines use a relatively large diameter hydraulic cylinder for closing mold halves and preloading the mold sections. This cylinder must have a stroke equal to the maximum distance that the mold halves must be separated for removal of the molded material. Therefore, for each cycle of operation of the machine a large volume of fluid must be pumped into and out of the hydraulic clamping cylinder. This type of mechanism has the inherent disadvantages of a hydraulic system outlined above. The hydraulic system for controlling the large cylinder with its large pipes and valves required to displace the hydraulic fluid into and out of the clamping cylinder is quite expensive. Another disadvantage is the length of the tie bars or rods used to clamp the platens which must be equal in length to the largest mold to be used between the platens, plus the thickness of the platens and the opening distance of the platens to remove the molded article. Previously, these tie rods or bars have also been used as guides or rails in aligning the mold sections when they are brought together. Therefore, the tie rods have to be spaced a sufficient distance apart to allow access to the mold sections and removal of the molded article through the tie rods.

The present invention overcomes the aforementioned deficiencies by providing a new and improved force producing apparatus which may be utilized in place of a hydraulic clamp, which is capable of exerting or transmitting a large force, which is relatively simple in construction, which requires only a relatively small quantity of fluid to actuate it, and which presents no fluid leakage problems.

Briefly stated, the invention, in one form thereof, comprises a movable member and a force reacting member, the movable member being arranged to be forced away from the reaction member. Means which may be integral with the movable member and the reacting member define a cavity between said members and an expansible cell is positioned in the cavity between the members. The cell comprises a normally inelastic member having a flexible material cast thereabout and bonded to the surface thereof adjacent the reaction member. The unbonded side of the inelastic member and the flexible material define an expansible chamber. Further means are provided for applying fluid under pressure into the chamber to expand the cell and force the movable member away from the reaction member. As applied to an injection molding assembly the movable platen is formed into two sections defining a cavity therebetween, one section comprising the aforesaid movable member and the other the aforesaid reaction member, and the cavity contains the expansible cell. Upon expansion of the cell the movable platen section furthest removed from the mold halves is limited in movement from the stationary platen. The other section of the movable platen is forced against the mold sections, preloading the mold sections into compression to hold them together and thereby prevent any harmful flashing of the molding material therebetween.

Accordingly, an object of this invention is to provide a new and improved force producing means.

Another object of this invention is to provide new and improved force producing means which may be self-contained within the apparatus upon which it acts and reacts.

Another object of this invention is to provide new and improved force producing and clamping apparatus of the type described which is simple and economical in construction.

Another object of this invention is to provide a new and improved fluid actuated piston-like load cell which presents no fluid leakage problem.

Another object of this invention is to provide new and improved injection molding apparatus.

Another object of this invention is to provide new and improved injection molding apparatus having improved means for preloading the mold sections.

Another object of this invention is to provide an injection molding apparatus having new and improved self-contained means for preloading the mold sections.

A further object of this invention is to provide injection molding apparatus wherein one of the platens includes new and improved means for preloading the mold sections.

A still further object of this invention is to provide a new and improved injection molding apparatus which facilitates placement of molds between the platens thereof and facilitates removal of the molded articles therefrom.

The features of the invention which are believed to be novel are pointed out with particularity and distinctly claimed in the concluding portion of this specification. The invention, however, both as to its organization and operation, together with further objects and advantages thereof may best be appreciated by reference to the following detailed description of a preferred embodiment thereof taken in conjunction with the drawings, in which;

FIG. 3 is a sectional view seen along line 3—3 of FIG. 1;

FIG. 4 is a view, partly schematic and partly diagrammatic, showing the hydraulic control system for the apparatus of FIGS. 1–3; and FIG. 5 is an elevation in half section of another embodiment of the invention.

Figure 2:
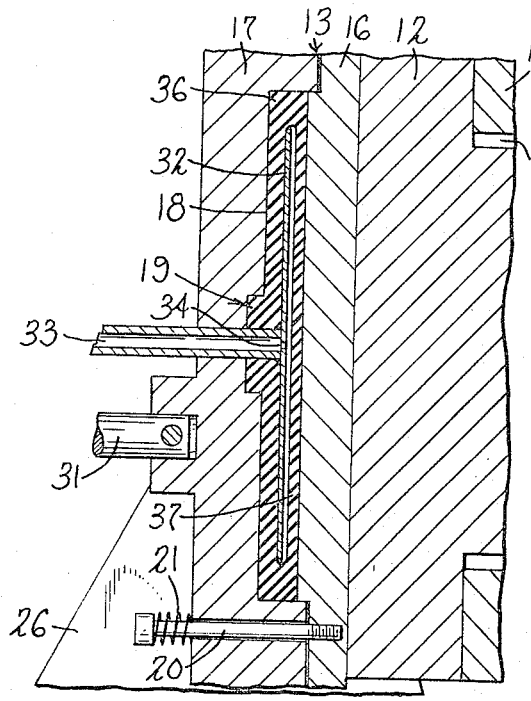
FIG. 2 is an enlarged view of the portion of FIG. 1 showing the means provided for preloading the mold sections.

A preferred embodiment of the invention is in an injection molding machine. Reference is first made to FIG. 2 which shows in section the movable platen of an injection molding machine hereinafter described. The movable platen 13 comprises a movable member shown as Section 16 and a reaction member shown as a backup plate or Section 17. The members 16 and 17 define therebetween a cavity 18 which contains a load cell 19. Load cell 19 comprises an inelastic member in the form, as illustrated, of a metal disc 32 mounted to a fluid conduit in the form of pipe 33 and having a port 34 therein. A flexible material such as rubber is cast about disc 32 in the shape and configuration of the cavity. In forming the load cell 19 the flexible material 36 is cast about disc 32 and is allowed to bond the rear surface to the peripheral edges thereof and to the side of the adjacent portion of pipe 33. During the bonding, or rather the casting of the flexible material about the pressure plate, a suitable coating may be put on the front surface of disc 32 to prevent the bonding of the flexible material.

When hydraulic or pneumatic fluid is introduced into pipe 33 it forces portion 37 of the flexible material towards pressure plate 16 and enlarges cavity 18. During this operation member 17 being held stationary, reacts against the pressure produced in load cell 19. Inelastic member 32 acts as a force directing member to make the expansible chamber expand in the direction away from it.

The operation and advantages of the force producing apparatus will now be explained in more detail in conjunction with an injection molding machine.

Figure 1:
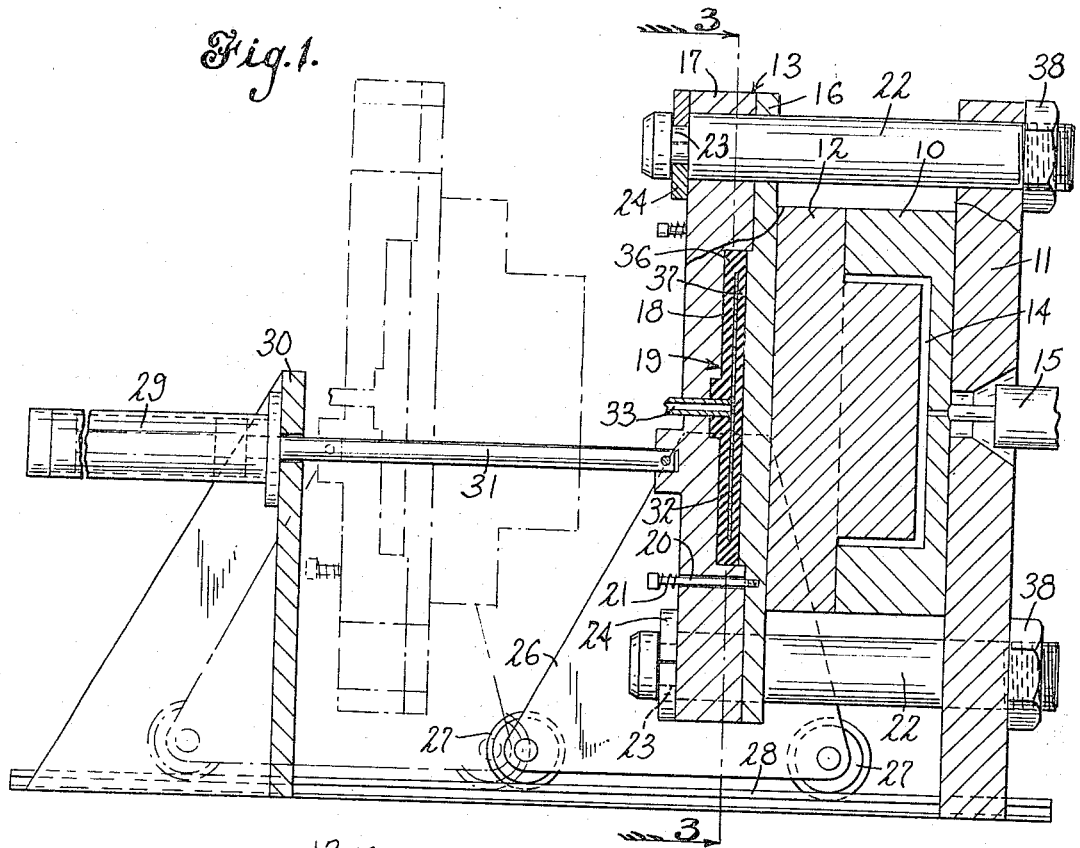
FIG. 1 is a sectional view of injection molding apparatus embodying the invention showing the apparatus in operative position in full line and in open position in broken line.

Referring now to FIG. 1, a mold cavity half 10 is mounted to a stationary platen 11 and has a mating core portion 12 mounted on movable platen assembly 13. Material to be molded is injected into the mold cavity 14 defined by the cavity and core sections 10 and 12 by means of a conventional injection chamber and nozzle 15 projecting through platen 11. Movable platen assembly 13 comprises a pressure plate 16 adapted to be preloaded to hold the mold sections 10 and 12 in compression and a backup plate 17. Pressure plate 16 and backup plate 17 are arranged to define therebetween a cavity 18 which contains a load cell 19 hereinafter described. Pressure plate 16 and backup plate 17 are mounted to each other by means of a plurality of bolts 20 threadably received in pressure plate 16 and extending through backup plate 17. Biasing springs 21 are positioned between the heads of the bolts 20 and backup plate 17 to allow limited movement of pressure plate 16 with respect to backup plate 17.

When in the operative position movable platen assembly 13 is mounted to the stationary platen 11 by means of a plurality of tie bars or rods 22 which are provided at one end thereof with shoulder portions of reduced diameter 23 adapted to receive locking retainers 24 therein and prevent movement of backup plate 17 away from stationary platen 11. Movable platen assembly 13 is carried on a carriage comprising side supports 26. Supports 26 are mounted on wheels 27 movable on rails 28. In this manner the movable platen assembly 13 is movable towards and away from (as shown in broken line) stationary platen 11. In this construction the movable platen does not depend on the tie rods as guides. Therefore, the tie rods need only be long enough to allow acceptance of a desired mold between the platens, and the mold does not have to be inserted between the tie rods but may be placed on the platens when they are in an open position as shown in broken line in FIG. 1. A small hydraulic cylinder 29 mounted on a support 30 may be provided to move the movable platen assembly. The piston rod 31 of cylinder 29 is attached to backup plate 17 in a suitable manner.

To explain the operation of the device of FIGS. 1–3 reference is now made to FIG. 4 which illustrates a hydraulic system for controlling the apparatus. Cylinder 29 is controlled through a bi-directional valve 40 operated by a solenoid 40a. Tie bar locking retainers 24 are each operated by a hydraulic cylinder 41 also controlled by a bi-directional valve 42 operated by a solenoid 42a. Hydraulic fluid is supplied to the load cell through a hydraulic valve 43 operated by solenoid 43a, and a hydraulic intesifier INT. All of the solenoid valves receive hydraulic fluid from a pump 45 over line 46 from the high pressure side of pump 45. Pump 45, driven by motor 47, draws hydraulic fluid from a reservoir R and the return lines of all of the valves also lead to reservoir R. The hydraulic system includes a usual pressure relief valve 48 on the high pressure side of pump 45.

Upon initiation of a cycle of operation the movable platen assembly 13 is in the position shown in broken line in FIG. 1. To commence a cycle of operation solenoid 40a is energized to allow introduction of fluid into the left side of cylinder 29. This causes cylinder 29, through piston 31, to push the movable platen assembly with mold half 12 thereon into contact with mold section 10 and define cavity 14. When the mold is closed cylinders 41, only one shown, are actuated to move the locking retainers 24 into shoulders 23 to lock the assembly together as shown in full line in FIG. 1. Then solenoid 43a of valve 43 is energized to apply normal hydraulic pressure, that is the pressure on the high side of pump 45 to intensifier INT which results in high pressure being applied to the load cell. A hydraulic intensifier which is well known in the art comprises a hydraulic cylinder having two diameters and a piston in each diameter. It is used to increase or amplify the hydraulic pressure applied thereto. The output of the intensifier produces the high preloading force on platen portion 16 which holds the mold halves 10 and 12 in position against the high pressure of the material injected into the mold cavity.

Now, when hydraulic fluid is introduced into pressure pipe 33 it forces portion 37 of the flexible material towards pressure plate 16 and tends to enlarge cavity 18. Hydraulic fluid introduced into cell 19 under pressure produces a force on pressure plate 16 urging it toward the mold sections. At this time backup plate 17 is prevented from movement due to locking retainers 24 fitted into shoulders 23. The compressive force on the mold sections is reacted through the tie bars 22 which are placed in tension and which may stretch slightly. Tie bars 22 are held in stationary platen 11 by associated nuts 38 which are initially adjusted to allow all tie bars 22 to carry equal tension when the mold is preloaded. The preloading force is made sufficient to withstand the force developed by the molding material as it is injected into the molds. This force may amount to two to five tons per square inch of projected mold area. Material is now injected into the mold cavity by conventional injection means, and allowed to cure. After curing, solenoid 43a is de-energized removing the preloading force on pressure plate 16. Solenoid 42a is de-energized to remove locking retainers 24 from the tie bars. Solenoid 40a is then de-energized and main cylinder 29 draws the platen assembly back along rails 28 to open the mold. The molded article is then removed and the cycle may be repeated.

It will be understood that the above described hydraulic control circuitry is only exemplary of one means of cycling the apparatus disclosed and that variations in the equipment and cycle may be made without departing from the scope of the invention.

Moreover, the cavity between the backup plate and the pressure plate may be defined in various configurations and the load cell shaped accordingly. For example, if it shoul dbe desired to incorporate means for ejecting the molded article the load cell could be made doughnut shaped so that the ejecting means could be actuated through the center of the backup plate and the pressure plate. It will be apparent that the load cell could be incorporated in the stationary platen.

Another embodiment of the invention wherein the load cell is incorporated in a more conventionally arranged force producing apparatus is shown in FIG. 5 which illustrates a housing member 50 having an interior axially extending cylindrical configuration with a liner 52 therein. Positioned at the lower end of bore 50 is a ram 53 which acts upon a pressure plate 54 which in turn acts upon some member such as a journal box 55. Positioned within member 50 is a reaction member 56 which is held therein by means of its flange 57 and a locking bar 58 extending through housing member 50 and across reaction member 56.

Sleeve 51, reaction member 56, and ram 53 define a cavity which receives therein a load cell comprising an inflexible member such as plate 59 having flexible material, such as rubber 60 bonded thereto in a manner previously described. The plate 59 and material 60 define an expansible chamber 61 which in FIG. 5 is shown in an expanded condition.

Fluid under pressure may be delivered to chamber 61 through a coupling 62 extending through material 60 and providing a conduit into chamber 61. Extending from coupling 62 is a pipe 63 leading outwardly from housing member 50 to a source of fluid pressure (not shown).

In operation, fluid under pressure is supplied through pipe 63 to the load cell and more specifically into chamber 61 which forces ram 53 downwardly onto pressure plate 54 which in turn creates a pressure on the top of journal box 55. It will be apparent that when fluid under pressure is introduced into and expands chamber 61 that equal unit pressure to that exerted on ram 53 will react upon reaction member 56. However, reaction member 56 is prevented from other than very limited motion by locking bar 58. It will be understood that the flanges 57 of reaction member 56 could be secured directly abutting sleeve 51 to prevent any movement thereof. It will thus be seen that the force producing member herein provided is self-sealing and for its operation requires only a reaction member and a movable member and means defining a cavity therebetween. In practice, the dimensions of the load cell will be selected so that in an unexpanded condition the load cell will essentially fill the cavity defined therefor.

It is thus beieved to be apparent that the invention provides a new and improved force producing apparatus which is capable of exerting a very high pressure or force over a short distance and is suitable not only for moving an object over a short distance to a predetermined position but is further capable of exerting a clamping force on an object to hold it in a predetermined position.

The disclosed embodiments of the invention efficiently attain the objects set forth as well as those made apparent from the preceding description. Inasmuch as modifications of the disclosed embodiment of the invention as well as other embodiments thereof may occur to those skilled in the art, it is intended to cover in the appended claims all embodiments of the invention and modifications to the disclosed embodiment of the invention which do not depart from the spirit and scope of the invention.

What is claimed is:

1. Injection molding apparatus comprising first and second platens, said first and second platens adapted to have mounted thereon complementary facing mold sections, one of said platens comprising first and second generally plate-like members having contacting surfaces, one of said plate-like members defining a substantially shallow cylindrical cavity centrally thereof, the other of said plate-like members having a cylindrical projection extending part way into said cavity, an expansible cell in said cavity, said cell comprising a plate-like member having substantially parallel surfaces on either side thereof and a port defined therein, a fluid pressure conduit communicating with said port and extending from one side thereof, an elastomeric material cast about and enveloping said member and a portion of said conduit, said material being cast in the shape and size of the cavity, said material being bonded to the surface of said member from which said conduit extends and unbonded to the other side thereof, the unbonded side of said member and said material being arranged to receive fluid pressure through said conduit and port to expand said cell and define an expansible pressure chamber, said elastomeric material and said plate-like member volumetrically filling said cavity, means for limiting movement of said platens from each other, and means for introducing fluid under pressure to said conduit to expand said cell and force said first and second plate-like members apart.

2. The apparatus of claim 1 wherein one of said platens is movable with respect to the other and said movable platen is comprised of said first and second platen sections and is mounted on rails for movement toward and away from the other of said platens and said apparatus includes means for moving said movable platen on said rails.

3. Injection molding apparatus comprising first and second platens, said first and second platens adapted to have molded thereon complementary facing mold sections, the first of said platens comprising first and second sections having surfaces in normal contacting relation and defining an enclosed cavity therebetween, means biasing said first and second sections toward each other to normally provide full surface contact therebetween, an expansible cell in said cavity, said cell comprising a plate-like member having substantially parallel surfaces on either side thereof and a port defined therein, a fluid pressure conduit communicating with said port and extending from one side thereof, an elastomeric material cast about and enveloping said plate-like member and a portion of said conduit, said elastomeric material being cast in the size and shape of said enclosed cavity and together with said plate-like member volumetrically filling said cavity, said elastomeric material being bonded to the side of said member from which said conduit extends, the unbonded side of said member and said elastomeric material being arranged to receive fluid pressure through said conduit and port to expand said cell and define an expansible fluid pressure chamber and force said first and second sections apart, said conduit extending through one of said sections, means for limiting movement of said platens away from each other when forcing said sections apart comprising tie bars extending from one of said platens through the other of said platens and guide means for moving said other of said platens away from said one of said platens a distance sufficient to disengage said other of said platen from said tie bars to facilitate removal of a molded article from the mold.

4. A force-producing apparatus comprising a movable member and a reaction member, said movable member being arranged to be forced linearly away from said reaction member, means defining a cavity between said members, an expansible cell in the cavity between said members, said expansible cell comprising a plate-like member having substantially parallel surfaces on opposite sides thereof, a port defined in said member, a fluid conduit communicating with said port and extending from one side of said member, an elastomeric material cast about and enveloping said plate-like member and a portion of said conduit and bonded to only one surface of said plate-like member, said elastomeric material being cast in the size and shape of said cavity and together with said plate-like member volumetrically filling said cavity, the unbonded side of said plate-like member and said elastomeric material being arranged to receive fluid under pressure therebetween to define an expansible chamber, said chamber being adapted to receive fluid under pressure therein through said conduit and port to expand said cell and force said movable member away from said reaction member.

5. A force-producing apparatus comprising a movable member and a reaction member, said movable member being arranged to be forced linearly away from said reaction member, means defining a cavity between said members, an expansible cell in the cavity between said members, said expansible cell comprising a plate-like member having substantially parallel surfaces on opposite sides thereof, a port defined in said member, a fluid conduit communicating with said port and extending from one side of said member, an elastomeric material cast about and enveloping said plate-like member and bonded to only the surface thereof adjacent said reaction member, said elastomeric material being cast in the size and shape of said cavity and together with said plate-like member volumetrically filling said cavity, the unbonded side of said plate-like member and said elastomeric material being arranged to receive fluid under pressure therebetween to define an expansible chamber, said chamber being adapted to receive fluid under pressure therein through said port and conduit to expand said cell and force said movable member away from said reaction member.

6. A force-producing apparatus comprising a movable member and a stationary reaction member, said movable member being arranged to be forced linearly away from said reaction member, said movable and reaction members having generally planar facing surfaces, a shallow cylindrical cavity defined in one of said members recessed from its planar facing surface, a cylindrical projection defined on the other of said members and extending from its planar facing surface into a portion of the depth of said cavity, an expansible cell in the cavity between said members, said expansible cell comprising a plate-like member having substantially parallel surfaces on opposite sides thereof, a port defined in said member, a fluid conduit communicating with said port and extending from one side of said plate-like member, an elastomeric material cast about and enveloping said member and bonded to only one surface thereof, said elastomeric material being cast in the size and shape of said cavity and together with said plate-like member volumetrically filling said cavity, the unbonded side of said plate-like member and said elastomeric material being arranged to receive fluid under pressure therebetween to define an expansible chamber, said chamber being adapted to receive fluid under pressure therein through said port to expand said cell and force said movable member away from said reaction member.

7. A force-producing apparatus comprising a movable member and a reaction member, said movable member being arranged to be forced linearly away from said reaction member, means defining a cavity between said members, an expansible cell in the cavity between said members, said expansible cell comprising a plate-like member having substantially parallel surfaces on opposite sides thereof, a port defined in said member, a fluid conduit communicating with said port and extending from one side of said plate-like member, an elastomeric material cast about and enveloping said member and bonded only to the edges thereof and the surface thereof facing said reaction member, said elastomeric material being cast in the size and shape of said cavity and together with said member volumetrically filling said cavity, the unbonded side of said plate-like member and said elastomeric material being arranged to receive fluid under pressure therebetween to define an expansible chamber, said chamber being adapted to receive fluid under pressure therein through said port to expand said cell and force said movable member away from said reaction member.

8. A force-producing apparatus comprising housing means defining a cylindrical chamber, a movable member in said chamber at one end thereof and a reaction member in said chamber at the other end thereof, said movable member being arranged to be forced away from said reaction member, said housing means and said members defining a cavity between said members, an expansible cell in the cavity between said members, said expansible cell comprising a plate-like member having substantially parallel surfaces on opposite sides thereof, a port defined in said member, a fluid conduit communicating with said port and extending from one side of said member, an elastomeric material cast about and enveloping said plate-like member and a portion of said conduit and bonded to only one surface thereof, said elastomeric material being cast in the size and shape of said cavity and together with said plate-like member volumetrically filling said cavity, the unbonded side of said plate-like member and said elastomeric material being arranged to receive fluid under pressure therebetween to define an expansible chamber, said chamber being adapted to receive fluid under pressure therein through said port to expand said cell and force said movable member away from said reaction member.

9. An expansible cell comprising a plate-like member having substantially parallel surfaces on either side thereof and a port defined therein, a fluid pressure conduit communicating with said port and extending from one side of said plate-like member an elastomeric material cast about and enveloping said member and a portion of said conduit, said material being cast in a predetermined three dimensional configuration, said material being bonded to the side of said member from which said conduit extends, the unbonded side of said member and said elastomeric material being arranged to receive fluid pressure through said conduit and port to expand said cell and define an expansible fluid pressure chamber.

References Cited

UNITED STATES PATENTS 2,869,173  1/1959  Van Hartesveldt et al.
3,006,306  10/1961  Pfeiffer et al.

J. SPENCER OVERHOLSER, *Primary Examiner.*

WILBUR L. McBAY, *Examiner.*